United States Patent
Okui et al.

[11] Patent Number: 6,024,519
[45] Date of Patent: Feb. 15, 2000

[54] THROWAWAY INSERT FOR BALL END MILL

[75] Inventors: Syoji Okui; Shigenori Emoto; Atuhiko Maeta; Kazuo Maeda; Jun Maeda, all of Itami, Japan

[73] Assignee: Sumitomo Electric Industries, Ltd., Osaka, Japan

[21] Appl. No.: 09/145,761

[22] Filed: Sep. 2, 1998

[30] Foreign Application Priority Data

Nov. 11, 1997  [JP]  Japan ................................ 9-308752

[51] Int. Cl.[7] ...................................................... B23C 5/20
[52] U.S. Cl. ............................ 407/113; 407/40; 407/42; 407/65
[58] Field of Search ............................ 407/35, 40, 42, 407/54, 65, 113, 114

[56] References Cited

U.S. PATENT DOCUMENTS

| | | | |
|---|---|---|---|
| 4,898,499 | 2/1990 | Tsujimura et al. | 407/65 X |
| 5,221,162 | 6/1993 | Okawa | 407/40 |
| 5,294,219 | 3/1994 | Shiratori et al. | 407/42 X |

FOREIGN PATENT DOCUMENTS

| | | |
|---|---|---|
| 0 842 723 A1 | 5/1998 | European Pat. Off. . |
| 64-52613 | 3/1989 | Japan . |
| 1-84916 | 6/1989 | Japan . |
| 6-179110 | 6/1994 | Japan . |
| 2 135 612A | 9/1984 | United Kingdom . |

*Primary Examiner*—Andrea L. Pitts
*Assistant Examiner*—Henry W. H. Tsai
*Attorney, Agent, or Firm*—McDermott, Will & Emery

[57] ABSTRACT

A throwaway insert for a ball end mill having an ideal cutting edge shape corresponding to the cutting speeds and loads at different portions of the cutting edges, high in strength and capable of discharging chips smoothly. As viewed in a direction perpendicular to the line connecting noses, each cutting edge forms a convex curve with its nose portion at the lowest level. As viewed in a direction perpendicular to the abovesaid direction, rake faces form symmetrical, downwardly sloping convex accurate surfaces or straight surfaces having a positive rake angle of 5–25°. The wedge angle at the cutting edges is set at 85–65°. Thus, the rake angle will be negative at the noses and positive at other portions. Further, the rake angle increases toward the side where the cutting speed is higher. The thickness of the insert increases toward the side where the load is greater. Since this insert is a modification of a negative insert, i.e. an insert of the type having a side perpendicular to its bottom, it has enough strength. Chips can be discharged smoothly too.

5 Claims, 4 Drawing Sheets

FIG. 1A
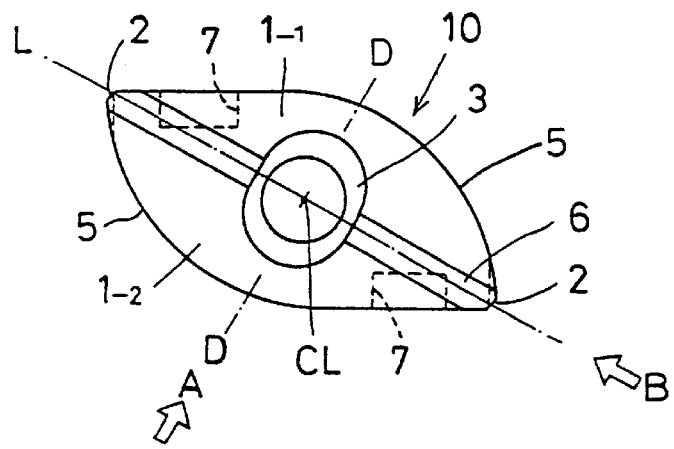
FIG. 1B
FIG. 1C
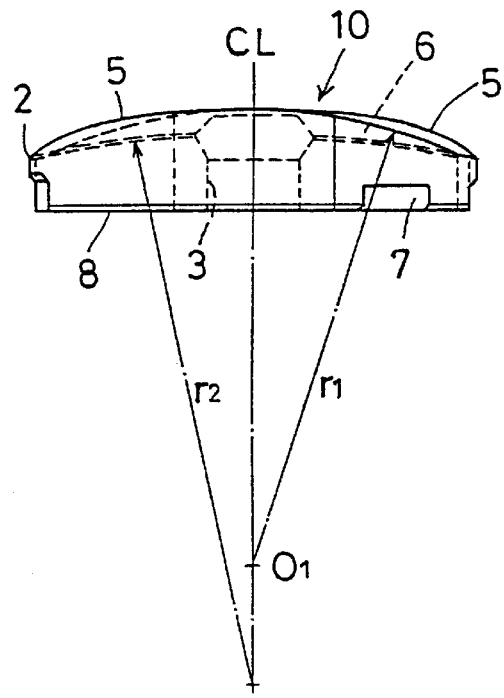
FIG. 1D
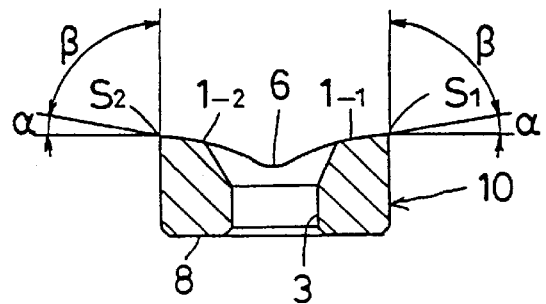

THROWAWAY INSERT FOR BALL END MILL

BACKGROUND OF THE INVENTION

The present invention relates to a throwaway insert for a ball end mill for machining e.g. the contour of a mold.

Ordinary throwaway inserts for ball end mills have, as shown in FIG. 5, a substantially oval shape in plan with a flat rake face 1 and thus the cutting edge 5 is at the same level over the whole length.

The insert shown in FIG. 6 is a modified version, in which rake faces 1a, 1b near each nose 2 are angled to each other to vary the height of the cutting edge for smoother contact with a workpiece.

Further, a throwaway insert disclosed in unexamined Japanese utility model publication 1-84916 has a columnar convex surface extending toward each nose. Unexamined Japanese utility model publication 64-52613 proposes to form a recess near each nose while unexamined Japanese patent publication 6-179110 discloses an insert having a rake face forming a circular recess as a whole.

In ball end milling, the cutting speed is nearly zero near the nose at the center of rotation. It is high near the terminal end (outer-peripheral side of the tool) of the arc of the arcuate cutting edge extending from the from the nose. The cutting edge is thus subjected to different loads at its different portions. Thus, for optimum cutting edge shape it is required that the cutting edge strength is high near each nose and the cutting resistance is low at the terminal end of the arc of the cutting edge.

The insert of unexamined Japanese utility model publication 1-84916 and those shown in FIGS. 4 and 5 cannot answer this requirement because the rake face has no rake angle and thus the cutting resistance is high. On the other hand, the inserts of unexamined Japanese patent publication 6-179110 and unexamined Japanese utility model publication 64-52613 are too sharp in cutting edge angle at the noses and thus too low in cutting edge strength at the noses.

In the arrangement of the latter publication 64-52613, in which recesses are formed partially in the noses, chips tend to get stuck. In the arrangement of the former publication 6-179110, in which the entire rake face forms a curved recess, the insert is low in strength as a whole and tends to be damaged.

An object of the present invention is to provide a solution to these problems.

SUMMARY OF THE INVENTION

According to the present invention, there is provided a throwaway insert for a ball end mill, the throwaway insert, having a mounting hole in the center and diagonally opposite noses, and arcuate cutting edges provided between the noses so as to be symmetrical with respect to the center of the insert, wherein the insert has a substantially oval shape in plan, and has a side and a bottom that form an angle of 90° with each other, characterized in that when the insert is viewed from one end in a direction perpendicular to a line connecting the diagonally opposite noses, each of the cutting edges forms a convex curve having its portions at the noses disposed at the lowest level, and that when the insert is viewed from one side in a direction parallel to the line, rake faces of the two cutting edges form substantially symmetrical downwardly sloping convex arcuate surfaces or straight surfaces with a groove formed therebetween, the rake faces having a positive rake angle of 5–25°, and the cutting edges having a wedge angle of 85–65°.

The convex arc should have its center aligned with a central axis of the insert.

When the insert is viewed from one side in a direction perpendicular to the line connecting the noses, the bottom of the groove should preferably form a convex curve having its portions at the noses disposed at the lowest level and having a larger radius of curvature than the radius of curvature of the cutting edges.

The groove between the two rake faces may have an arcuate section.

With the arrangement of this invention, the rake angle of the rake face is negative near the noses. This improves strength. In an arrangement in which a groove having an arcuate section is provided between the right and left rake faces, the cutting edge height at the noses changes, so that load is dispersed.

The insert thickness increases gradually toward the radially outer side of the tool. Thus, the arcuate portion of each cutting edge is strengthened, so that the cutting edges are less likely to be damaged even if subjected to a large load.

Since the rake faces are downwardly sloping convex curved surfaces or straight surfaces having a positive rake angle of 5–25° and shaped so as not to hinder smooth flow of chips, chips are discharged smoothly.

The rake angle of the arcuate portion of each cutting edge, which is subjected to the largest load, is negative at the nose, and increases gradually toward the other end. Further, the cutting edge height changes such that contact with the workpiece takes place smoothly. Cutting resistance is thus low.

Since this insert is a modification of a negative insert, which has a side perpendicular to the bottom, and the entire insert thickness increases from the noses toward the center of the insert, the insert has a sufficient strength as a whole and less likely to be damaged.

In the arrangement in which recesses adapted to receive the rotation preventive protrusion are formed along the intersection between the side and the bottom, the insert can be stably held during machining. This prolongs the life of the insert.

Other features and objects of the present invention will become apparent from the following description made with reference to the accompanying drawings, in which:

BRIEF DESCRIPTION OF THE DRAWINGS

FIG. 1A is a plan view of a throwaway insert embodying the present invention;

FIG. 1B is a view of the insert of FIG. 1A having convex rake faces as seen in the direction B of FIG. 1A;

FIG. 1C is a side view of the insert of FIG. 1A as seen in the direction A;

FIG. 1D is a sectional view of the insert of FIG. 1A having convex rake faces, taken along line D—D of FIG. 1A;

DETAILED DESCRIPTION OF THE PREFERRED EMBODIMENT

Figure 2A:
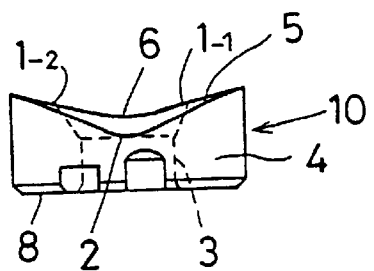
FIG. 2A is a view of the insert of FIG. 1A having straight rake faces as seen in the direction B of Fig. 1A.
Figure 2B:
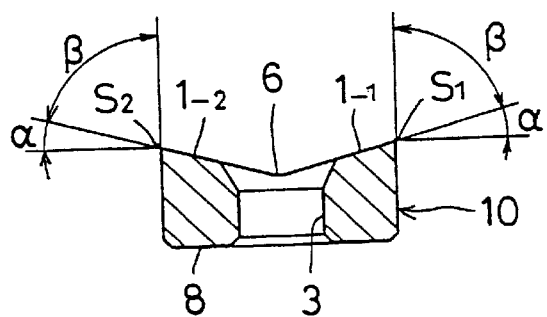
FIG. 2B is a sectional view of the insert of FIG. 1A having straight rake faces, taken along line D—D of FIG. 1A.

FIGS. 1–4 show a throwaway insert for a ball end mill embodying the present invention.

As shown in FIG. 1A, this throwaway insert 10 has diagonally opposite noses 2 and a mounting hole 3 in its center. Arcuate cutting edges 5 extend from the respective noses 2 so as to be symmetrical with respect to a central axis CL. The insert 10 has a substantially oval shape in plan as shown in FIG. 1A.

The insert 10 is formed with a groove 6 having an arcuate section and extending along line L connecting the noses 2 together. As shown in FIG. 1B, two rake faces 1-1 and 1-2 extend in opposite directions from the groove 6. The cutting edges 5 are the ridges defined by the rake faces 1-1 and 1-2 and the side face 4 perpendicular to the bottom 8.

FIG. 1C shows the side of the insert 10 as viewed in the direction of arrow A of FIG. 1A, namely, the direction perpendicular to line L. In FIG. 1C, the left half of the cutting edge 5 (portion having the shape of a ¼ circle in FIG. 1A) forms substantially a convex arc having its lowest point on the nose 2 at the left end and its highest point on a point corresponding to the insert central axis CL, while the right half of the cutting edge (its straight portion in FIG. 1A) forms substantially a convex arc having a radius r1 and having its lowest point on the nose 2 at the righthand end and its highest point on the point corresponding to the axis CL.

The center O1 of the righthand arc (FIG. 1C) formed by the straight portion of the cutting edge is on the central axis CL of the insert. The lefthand arc formed by the ¼ circle portion of the cutting edge may have its center on O1 and have the same radius r1 as the righthand arc. But in the embodiment, in order to increase the cutting edge strength at its ¼ circle portion, the insert has a greater thickness at this portion than at the straight portion of the cutting edge, and thus, at the ¼ circle portion the cutting edge is slightly higher than at its straight portion.

The groove 6 has both ends thereof, i.e. the ends on the noses 2, at the lowest level, and its bottom forms a convex arc having a radius of curvature r2 greater than the radius of curvature r1 of the cutting edges (FIG. 1C). Thus, the thickness of the insert at its portion where the groove 6 is formed increases gradually toward the center of the insert. The insert thus maintains high strength.

FIG. 1B shows the side of the insert 1 as viewed in the direction L (arrow B) of FIG. 1A. In this figure, the rake faces 1-1 and 1-2 rise obliquely from the groove 6 forming substantially symmetric convex arcs.

FIG. 2A shows the side of a different insert as viewed in the direction of arrow B as in FIG. 1A. As shown, the rake faces 1-1, 1-2 may rise obliquely from the groove 6 in substantially symmetric straight lines.

In either case, the farther away from the noses 2, the steeper the rise of the rake faces from the groove 6. Thus, the nearer to the side where the cutting speed is higher, the greater the rake angle.

FIG. 1D is a section taken along line D—D of FIG. 1A. The rake faces 1-1 and 1-2 have a positive rake angle $\alpha$ of 5–25° and a wedge angle $\beta$ of 85–65°. Other sections taken along lines parallel to the D—D line are also in similar states. Thus, the rake angles at any longitudinal portions of the cutting edge 5 are all positive except the nose portions.

As shown in FIGS. 1A, 1B, 1C and 2A, recesses 7 are formed along the intersection between the bottom 8 and the side face 4 at portions radially outwardly and rearwardly of the ball end mill from the center of the insert.

Figure 3:
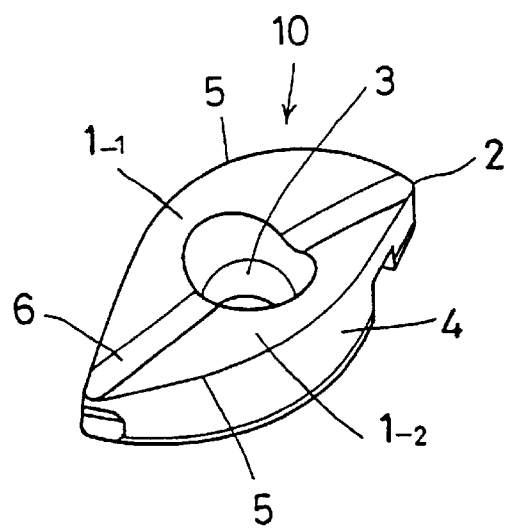
FIG. 3 is a perspective view of the throwaway insert of FIG. 1A.
Figure 4A:
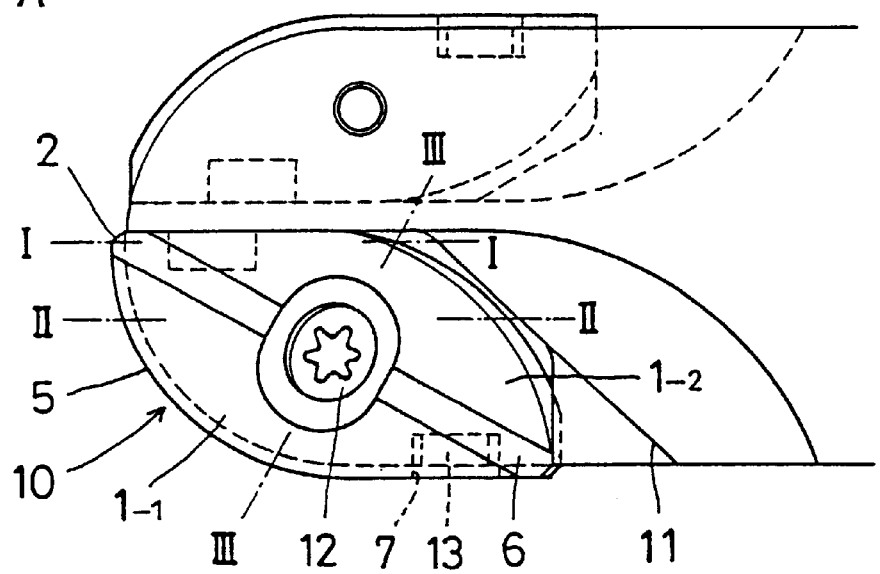
FIG. 4A is a view showing the throwaway insert of FIG. 1A as mounted on a ball end mill.

FIG. 3 is a perspective view showing the appearance of the throwaway insert of FIG. 1A. FIG. 4A shows the throwaway insert 10 as mounted on an end mill body 11 by means of a clamp bolt 12 with its side forming a relief angle. To prevent rotation of the insert, the end mill body has a protrusion 13 adapted to engage in one of the recesses 7 formed in the insert.

Figure 4B:
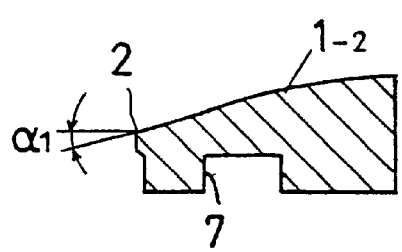
FIG. 4B is a sectional view taken along line I—I of FIG. 4A.
Figure 4C:
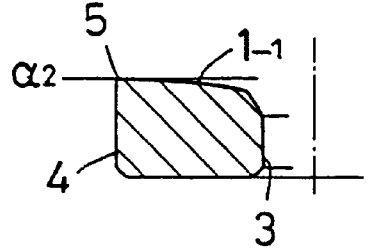
FIG. 4C is a sectional view taken along line II—II of FIG. 4A.
Figure 4D:
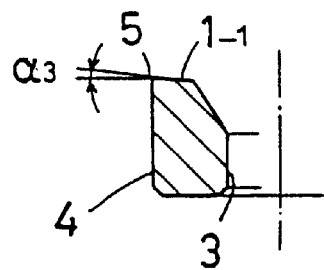
FIG. 4D is a sectional view taken along line III—III of FIG. 4A.
Figure 5A:
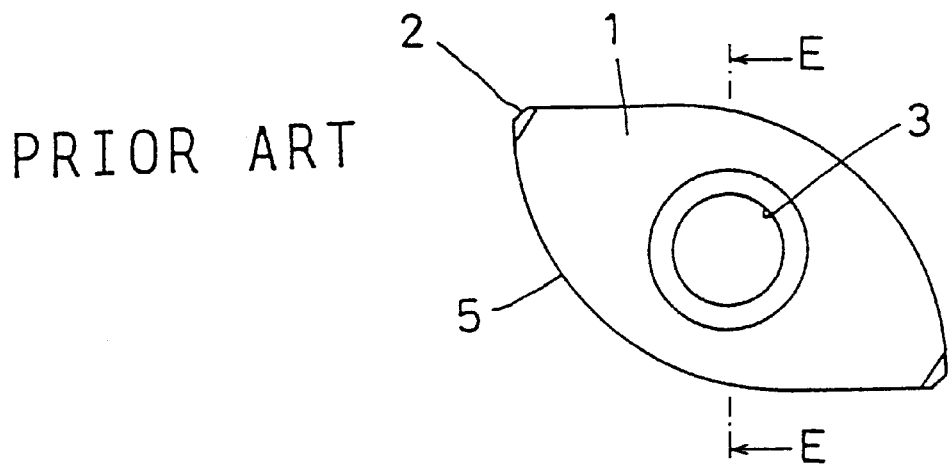
FIG. 5A is a plan view of a conventional throwaway insert for a ball end mill.
Figure 5B:
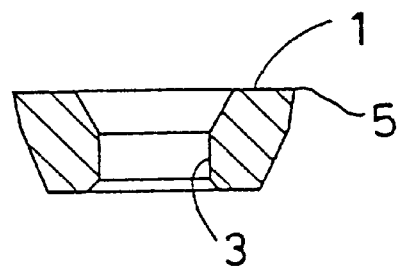
FIG. 5B is a sectional view taken along line E—E of FIG. 5A.
Figure 6A:
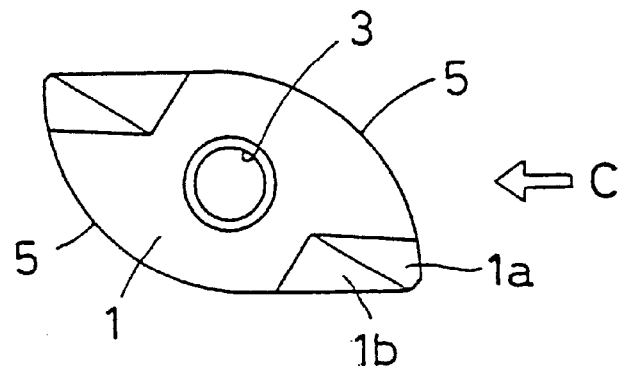
FIG. 6A is a plan view of another conventional throwaway insert.
Figure 6B:
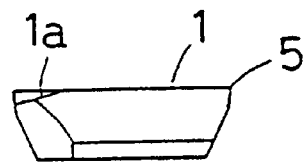
FIG. 6B is a view of the insert of FIG. 6A as seen in the direction C of FIG. 6A.

FIGS. 4B–4D show section al views taken along lines I—I, II—II and III—III of FIG. 4A, respectively. As shown, the rake angle $\alpha 1$ at the noses 2 is negative, so that the cutting edge strength is high to such an extent that the edges are less likely to chip. The rake angle $\alpha 2$ at portion II—II is a positive small angle near 0°, while the rake angle $\alpha 3$ at portion III—III is a positive angle greater than $\alpha 2$. Thus, the nearer to the side where the cutting speed is higher, the lower the cutting resistance.

According to the present invention, when viewed from a direction perpendicular to a line connecting the two noses, each cutting edge forms substantially a convex arch having its nose portions at the lowest level. Also, when viewed from a direction parallel to the line connecting the two noses, the rake face forms downwardly sloping arcuately convex surfaces or straight surfaces, with a positive rake angle of 5–25° and a cutting edge wedge angle of 85–65°. Thus, the nearer to the side where the cutting speed is higher, the higher the sharpness of cutting. Also, chips are discharged smoothly. Further, the nearer to the side where the load is greater, the thicker the insert. This leads to further improvement in performance, durability, machining efficiency and machining accuracy.

What is claimed is:

1. A throwaway insert for a ball end mill, said throwaway insert having a central mounting hole and diagonally opposite noses, and two arcuate cutting edges provided between the noses so as to be symmetrical with respect to the central mounting hole, wherein said insert has a substantially oval shape in plan, and has a side and a bottom that form an angle of 90° with each other, characterized in that when said insert is viewed from a direction perpendicular to a line connecting said diagonally opposite noses, each of said cutting edges forms a convex curve having portions at said noses disposed at a lowest level, and that when said insert is viewed from one end in a direction parallel to said line, rake faces of said two cutting edges form substantially symmetrical downwardly sloping convex arcuate surfaces or straight surfaces with a groove formed therebetween, said rake faces having a positive rake angle of 5–25°, and said cutting edges having a wedge angle of 85–65°.

2. A throwaway insert for a ball end mill as claimed in claim 1 wherein said convex curve has its center aligned with a central axis of said insert.

3. A throwaway insert for a ball end mill as claimed in claim 1 wherein, when said insert is viewed from the side in a direction perpendicular to said line, the bottom of said groove forms a convex curve having portions at said noses disposed at the lowest level and having a larger radius of curvature than the radius of curvature of said cutting edges.

4. A throwaway insert for a ball end mill as claimed in claim 1 wherein said groove is arcuate.

5. A throwaway insert for a ball end mill as claimed in claim 1 wherein said insert is formed with a recess along the intersection between said side and said bottom at a portion radially outwardly and rearwardly of the ball end mill from said mounting hole.

\* \* \* \* \*